United States Patent
Sone

(10) Patent No.: US 11,468,140 B2
(45) Date of Patent: Oct. 11, 2022

(54) NON-TRANSITORY COMPUTER-READABLE STORAGE MEDIUM AND INFORMATION PROCESSING DEVICE

(71) Applicant: BROTHER KOGYO KABUSHIKI KAISHA, Nagoya (JP)

(72) Inventor: Tatsuhiko Sone, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/069,906

(22) Filed: Oct. 14, 2020

(65) Prior Publication Data
US 2021/0109988 A1 Apr. 15, 2021

(30) Foreign Application Priority Data
Oct. 15, 2019 (JP) .............................. JP2019-188686

(51) Int. Cl.
*G06F 17/10* (2006.01)
*G06F 16/957* (2019.01)
*G06F 16/955* (2019.01)
*H04N 1/00* (2006.01)

(52) U.S. Cl.
CPC ...... *G06F 16/9577* (2019.01); *G06F 16/9566* (2019.01); *G06F 16/9574* (2019.01); *H04N 1/00464* (2013.01)

(58) Field of Classification Search
CPC ............. G06F 16/9577; G06F 16/9574; G06F 16/9566; H04N 1/00464
See application file for complete search history.

(56) References Cited

U.S. PATENT DOCUMENTS

| 5,963,964 A | * | 10/1999 | Nielsen | ............... G06F 16/9562 715/255 |
| 2003/0101236 A1 | * | 5/2003 | Ohara | .................... H04L 67/75 707/E17.108 |
| 2005/0105129 A1 | * | 5/2005 | Takahashi | .......... H04N 1/32529 358/1.15 |

(Continued)

FOREIGN PATENT DOCUMENTS

| JP | 2014-174928 A | 9/2014 |
| JP | 2018-173850 A | 11/2018 |

*Primary Examiner* — Shahid K Khan
(74) *Attorney, Agent, or Firm* — Kenealy Vaidya LLP

(57) ABSTRACT

A non-transitory computer-readable storage medium storing a control program, when executed by a computer, causing an information processing device to perform: selecting a target device for executing predetermined data processing based on an operation received by an operation unit; receiving an execution instruction by a user, which is for causing the selected target device to execute the predetermined data processing; acquiring identification information of the target device; generating a display URL which is for displaying a specific page on a display by a Web browser, the specific page being a Web page corresponding to the acquired identification information; determining whether a specific condition is satisfied, the specific condition being a condition for displaying the specific page on the display; and opening the Web browser by designating the generated display URL after the execution instruction is received and in a case where it is determined that the specific condition is satisfied.

14 Claims, 12 Drawing Sheets

(56) References Cited

U.S. PATENT DOCUMENTS

| | | | |
|---|---|---|---|
| 2006/0262349 A1* | 11/2006 | Moroi | H04N 1/00482 358/1.15 |
| 2007/0229885 A1* | 10/2007 | Kimura | G06F 3/1253 358/1.15 |
| 2009/0235173 A1* | 9/2009 | Ichihara | G03G 15/5087 715/733 |
| 2010/0039664 A1* | 2/2010 | Funakawa | G03G 15/502 358/1.15 |
| 2010/0123938 A1* | 5/2010 | Sunami | G06F 16/9577 358/1.18 |
| 2011/0055764 A1* | 3/2011 | Akuzawa | H04N 1/00973 715/835 |
| 2011/0093621 A1* | 4/2011 | Aritomi | H04L 12/282 710/12 |
| 2011/0173250 A1* | 7/2011 | Sato | H04N 1/00384 709/203 |
| 2011/0279846 A1* | 11/2011 | Nakashima | H04N 1/00408 358/1.13 |
| 2011/0320952 A1* | 12/2011 | Kataoka | H04N 1/00347 709/221 |
| 2012/0154840 A1* | 6/2012 | Kikuchi | H04N 1/00222 358/1.13 |
| 2012/0240029 A1* | 9/2012 | Sugaya | H04N 1/00464 715/234 |
| 2013/0238984 A1* | 9/2013 | Okazato | G06F 16/9577 715/238 |
| 2014/0278956 A1 | 9/2014 | Asoh et al. | |
| 2014/0376035 A1* | 12/2014 | Niimura | H04N 1/00204 358/1.15 |
| 2015/0206036 A1* | 7/2015 | Byer | G06F 3/1205 358/1.13 |
| 2018/0285467 A1 | 10/2018 | Ohara et al. | |

* cited by examiner

NON-TRANSITORY COMPUTER-READABLE STORAGE MEDIUM AND INFORMATION PROCESSING DEVICE

CROSS-REFERENCE TO RELATED APPLICATIONS

This application is based upon and claims the benefit of priority from prior Japanese patent application No. 2019-188686, filed on Oct. 15, 2019, the entire contents of which are incorporated herein by reference.

TECHNICAL FIELD

The present disclosure relates to technology of causing an information processing device to display a Web page.

BACKGROUND ART

Related art discloses a web server in which data for causing an information processing device to display a Web page is stored. The information processing device can display a Web page on a display by opening a Web browser to receive data from the web server connected via a network.

In an information processing device, when a Web browser is opened, a Web page corresponding to a designated URL is displayed on a display. For this reason, for example, if the Web page is displayed on the display at a timing at which a user is performing a variety of operations on an operation screen of the information processing device, the operation by the user is interrupted. Therefore, there is concern that the user may feel uncomfortable.

SUMMARY

The present disclosure provides an information processing device configured to display a Web page on a display at a timing at which a user does not feel uncomfortable, and a non-transitory computer-readable storage medium storing a control program readable by a computer of the information processing device.

According to an aspect of the present disclosure, there is provided a non-transitory computer-readable storage medium storing a control program readable by a computer of an information processing device, the information processing device including an operation unit, a display, and a communication unit and capable of connecting to a network via the communication unit, and the control program when executed by the computer, causing the information processing device to perform: selecting a target device for executing predetermined data processing based on an operation received by the operation unit; receiving an execution instruction by a user, which is for causing the selected target device to execute the predetermined data processing; acquiring identification information of the target device; generating a display URL which is for displaying a specific page on the display by a Web browser, the specific page being a Web page corresponding to the acquired identification information; determining whether a specific condition is satisfied, the specific condition being a condition for displaying the specific page on the display; and opening the Web browser by designating the generated display URL after the execution instruction is received and in a case where it is determined that the specific condition is satisfied.

According to another aspect of the present disclosure, there is provided an information processing device including: an operation unit; a display; a communication unit via which the information processing device is capable of connecting to a network; and a controller configured to: select a target device for executing predetermined data processing based on an operation received by the operation unit; receive an execution instruction by a user, which is for causing the selected target device to execute the predetermined data processing; acquire identification information of the target device; generate a display URL which is for displaying a specific page on the display by a Web browser, the specific page being a Web page corresponding to the acquired identification information; determine whether a specific condition is satisfied, the specific condition being a condition for displaying the specific page on the display; and open the Web browser by designating the generated display URL after the execution instruction is received and in a case where it is determined that the specific condition is satisfied.

DESCRIPTION OF EMBODIMENTS

First Embodiment

A printing system in accordance with the present embodiment will be described with reference to the drawings. The printing system is an example of a control system.

Figure 1:
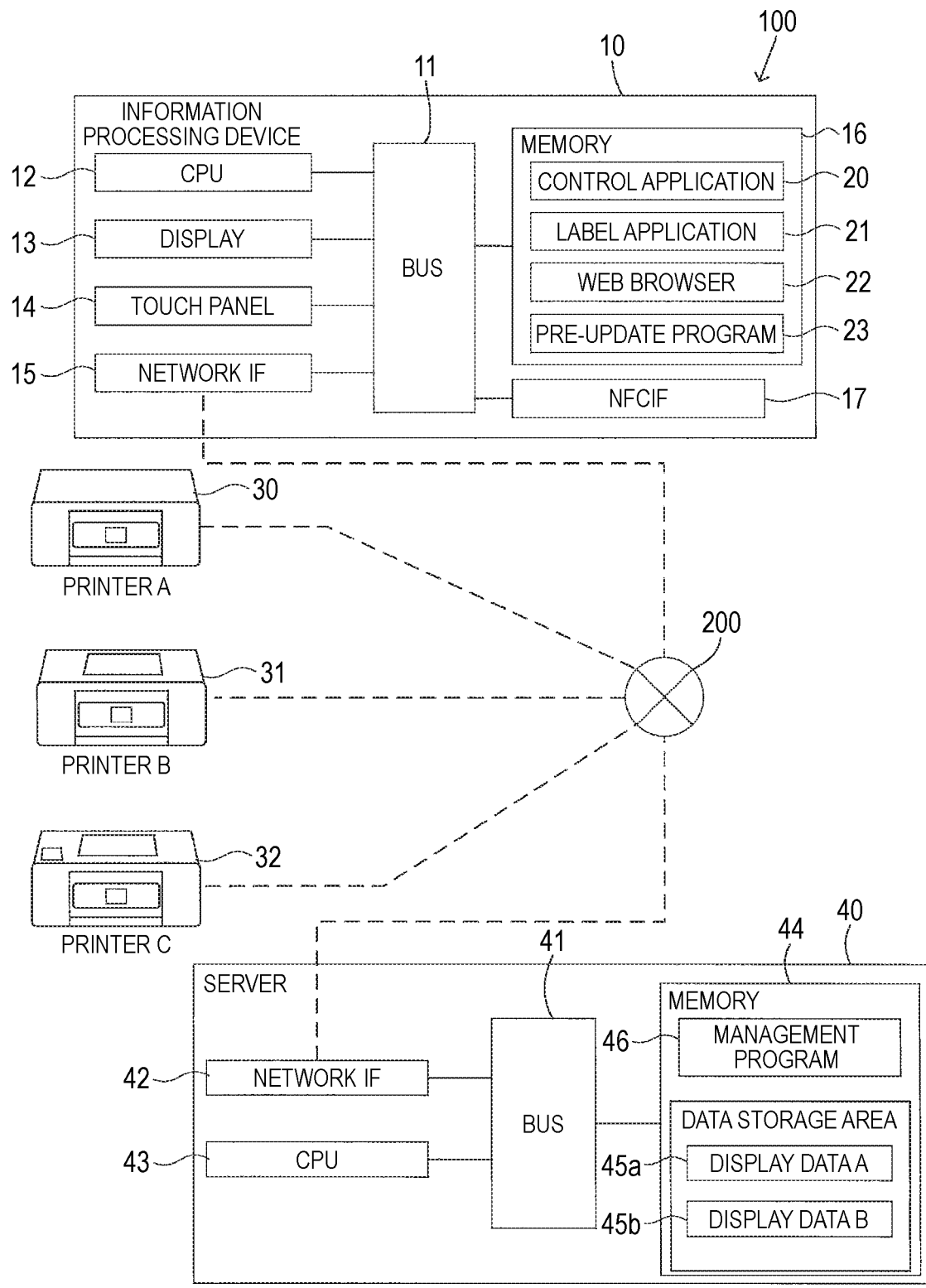
FIG. 1 is a block configuration diagram of a printing system.

A printing system 100 shown in FIG. 1 includes an information processing device 10, printers 30, 31 and 32, which are examples of the target device, and a server 40. The information processing device 10, the printers 30 to 32, and the server 40 are connected to a network 200. In the present embodiment, the network 200 may be the Internet, a local area network (LAN) or a combination of the LAN and the Internet. Also, the network 200 may be configured by a wired network, a wireless network or a combination of the wired and wireless networks. Specifically, the information processing device 10 and the printers 30 to 32 are wirelessly connected to a router (not shown) configuring a part of the network.

Each of the printers 30 to 32 is configured to print an image by discharging ink to a sheet that is a medium to be printed. The printer 31 of the printers 30 to 32 is a complex machine having a reading unit configured to read an image. The printer 32 has an interface conforming to Near Field Communication (NFC) standards, and can perform communication with the information processing device 10, in accordance with the NFC standards. Hereinbelow, a printer model of the printer 30 is referred to as "printer A", a printer model of the printer 31 is referred to as "printer B", and a printer model of the printer 32 is referred to as "printer C".

The information processing device 10 is a smartphone or a tablet terminal. The information processing device 10 includes a bus 11, a Central Processing Unit (CPU) 12, a display 13, a touch panel 14, a network IF 15, a memory 16, and an NFC IF 17, which are configured to perform communication with each other via the bus 11.

The display 13 has a display screen for displaying a screen. The touch panel 14 includes a touch sensor, and is arranged to cover the display surface of the display 13. The touch panel 14 is configured to detect approach and contact of a user's finger, a touch pen and the like to the touch panel 14, and to output an electric signal in response to the detection. Hereinbelow, an operation on the touch panel 14 by a user is also referred to as a user operation. In the present embodiment, the touch panel 14 corresponds to the operation unit. The information processing device 10 may include physical operation keys, as the operation unit.

The network IF 15 is configured to perform wireless communication such as Wi-Fi (R) (registered trademark), based on IEEE 802.11 standards and standards conforming thereto, for example. In the meantime, the network IF 15 may also be configured to perform short-range wireless communication such as Bluetooth (registered trademark) with the printers 30 to 32.

The NFC IF 17 can perform wireless communication based on the NFC standards. For this reason, the information processing device 10 can perform wireless communication with the printer 32 via the NFC IF 17, in accordance with the NFC standards.

The memory 16 is configured by a combination of a Random Access Memory (RAM), a Read Only Memory (ROM), and a flash memory, for example. Also, the memory 16 may be a computer readable storage medium. The computer readable storage medium includes a recording medium such as a CD-ROM, a DVD-ROM and the like.

In the memory 16, a control application 20, a label application 21 and a Web browser 22 are stored, in addition to a client-side Operating System (OS, not shown). The CPU 12 can perform communication with the printers 30 to 32 and the server 40 by executing the control application 20 under execution of the client-side OS. In a data storage area of the memory 16, a variety of data that is referred to when the CPU 12 executes the control application 20 is stored. In the present embodiment, the control application 20 corresponds to the control program.

The CPU 12 can prepare a label image that is used in printing processing by executing the label application 21 under execution of the control application 20. Specifically, in a case where a function of preparing a label image is selected under execution of the control application 20, the CPU 12 activates the label application 21. For example, the label image is an image that is printed on a recording medium such as a CD-ROM, a DVD-ROM or the like. The label application 21 causes a target device to print the prepared label image.

The CPU 12 can execute the Web browser 22 under execution of the client-side OS to download data stored in the server 40, thereby displaying a Web page on the display 13. Functions of the Web browser 22 will be described later.

The CPU 12 is configured to execute update processing of updating the control application 20, under execution of the client-side OS. In FIG. 1, for easy description, the control application 20 before update is described as a pre-update program 23. For example, when a new function is added to the pre-update program 23 or the pre-update program 23 is modified by the update processing, the control application 20 after update is obtained.

In the present embodiment, the processing of the CPU 12 that is executed in response to commands described in a program is mainly described. That is, in descriptions below, the processing such as "determining", "extracting", "selecting", "calculating", "specifying", "acquiring", "receiving", "controlling" and the like indicates the processing of the CPU 12. The processing that is executed by the CPU 12 includes hardware control via the client-side OS. In the meantime, "acquiring" is used as a concept that does not necessarily require a request. That is, processing of receiving data without a request of the CPU 12 is also included in the concept that "the CPU 12 acquires data". Also, "data" in the specification is indicated by a bit string that can be read into a computer. Data having the same substantial meaning and different formats is treated as the same data. The same applies to "information" in the specification.

The server 40 can transmit and receive a variety of data to and from the information processing device 10 via the network 200. The server 40 includes a bus 41, a network IF 42, a CPU 43, and a memory 44.

In a data storage area of the memory 44, display data 45*a* and 45*b* for displaying a Web page on the information processing device 10 is stored. The display data 45*a* and 45*b* includes text data that configures a text to be displayed on a screen, image data that configures an image to be embedded in a screen, and layout data that defines a variety of layouts of a screen. In the present embodiment, the text data is described by a markup language such as Hyper Text Markup Language (HTML). Also, in the text data, a Uniform Resource Locator (URL) indicative of a location of data of a link destination is described. The image data is generated in formats of PNG, JPG, SVG, GIF and the like. The layout data is described by Cascading Style Sheets (CSS), for example.

In the memory 44, a management program 46 that is a program that can be executed by the CPU 43 is stored, in addition to a server-side OS (not shown). The CPU 43 can execute the management program 46 under execution of the server-side OS, thereby selecting and reading out the display data 45*a* and 45*b* stored in the data storage area by using a URL designated by the information processing device 10.

Next, printing processing that is executed by the printing system 100 is described with reference to FIGS. 2 to 5.

Figure 2:
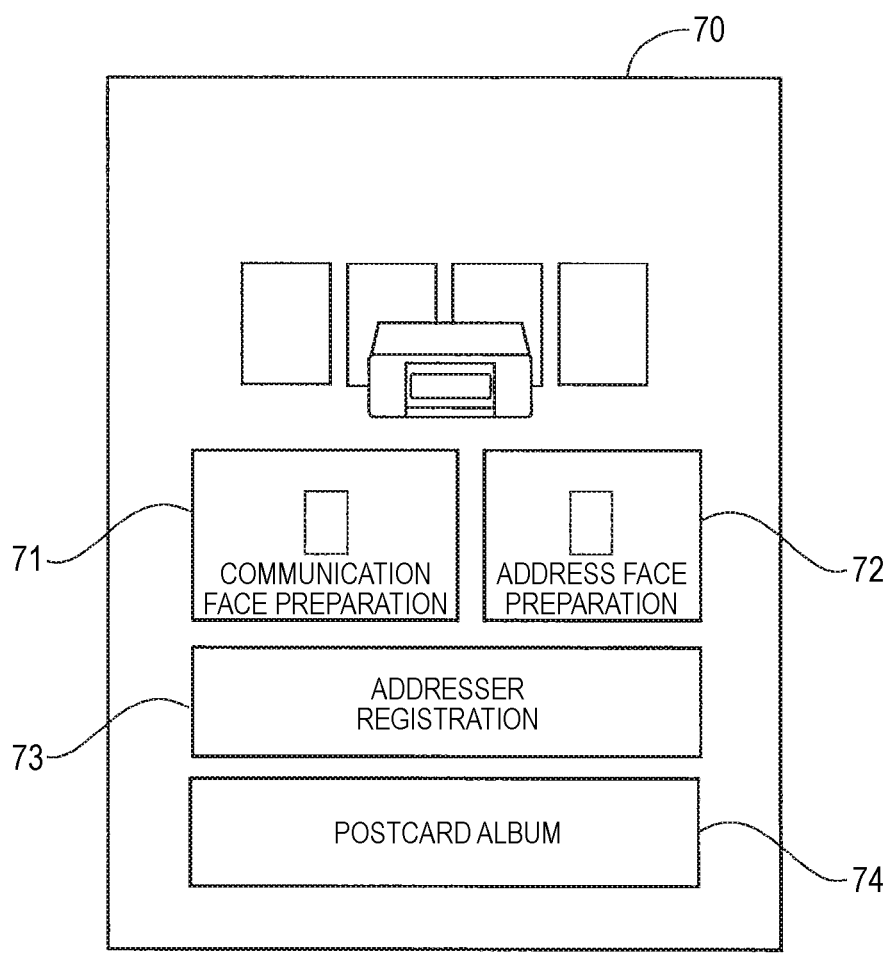
FIG. 2 depicts a function selection screen.

First, when a user operates the touch panel 14 to activate the control application 20, a function selection screen 70 shown in FIG. 2 is displayed on the display 13. In the present embodiment, the function selection screen 70 is a screen for causing the user to select each function of postcard printing, and tiles 71, 72, 73 and 74 for selecting each function of "communication face preparation", "address face preparation", "addresser registration" and "postcard album" are displayed thereon.

Figure 3:
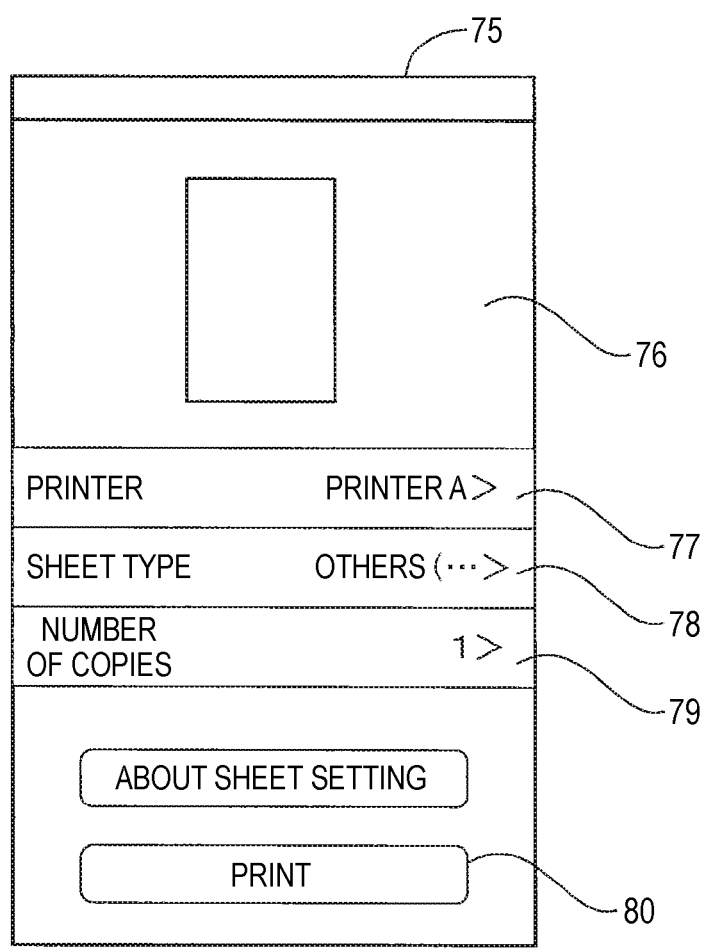
FIG. 3 depicts a communication face editing screen.

When the user selects the tile 71 on the function selection screen 70 by the user operation, a communication face editing screen 75 shown in FIG. 3 is displayed. The communication face editing screen 75 includes a communication face editing area 76, a printer selection field 77, a sheet type selection field 78, a copy-number field 79, and a printing execution button 80. The communication face editing area 76 is an area for receiving editing of an object such as a text, an image and the like to be printed on a communication face of a postcard. The printer selection field 77 is a field for receiving selection of a printer for printing the communication face. The sheet type selection field 78 is a field for receiving a type of a postcard. The copy-number field 79 is a field for receiving a number of postcards whose address face is to be printed. When the printer selection field 77 is selected by the user operation, the screen shifts to a printer selection screen, so that the user can select a printer for printing the communication face.

Figure 4:
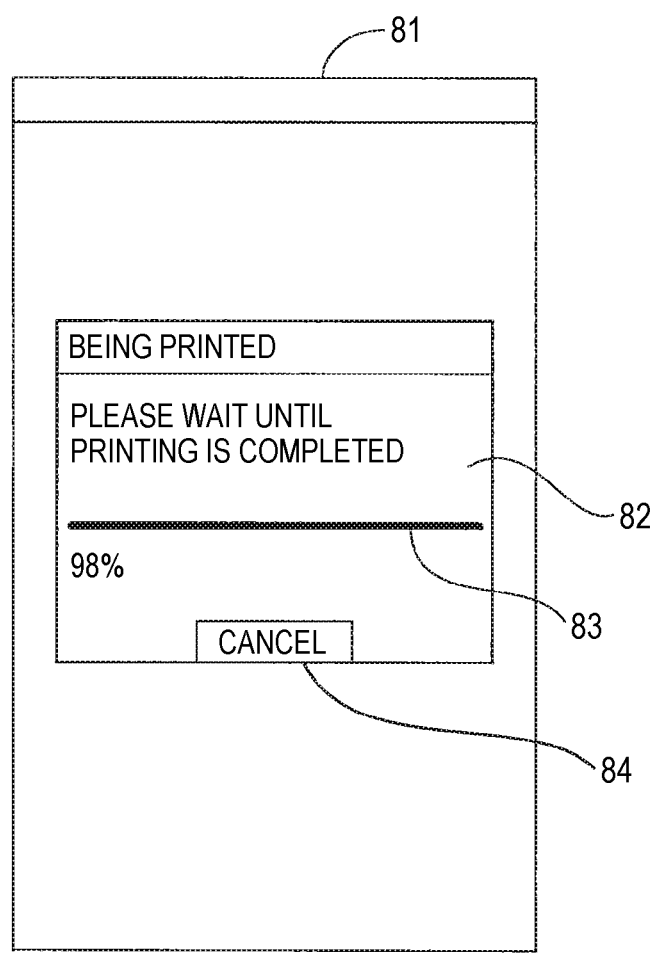
FIG. 4 depicts a progressing screen.

In a case where the printing execution button 80 is selected by the user operation, the CPU 12 transmits a printing instruction to print the communication face displayed in the communication face editing area 76 to the printer selected in the printer selection field 77. In the present embodiment, when the printing execution button 80 is selected by the user operation, a progressing screen 81 shown in FIG. 4 is displayed. The progressing screen 81 includes a text 82, which notifies that the printing processing is currently being executed, a progress bar 83, which visually indicates a progressing degree of the printing processing, and a cancel button 84 for ending the printing processing. The CPU 12 is configured to generate a printing job corresponding to the communication face displayed in the communication face editing area 76, and to transmit the generated printing job to the printer. In the progressing screen 81, in a case where the progress bar 83 reaches 100%, the printing processing of the communication face by the printer is completed.

Also, in a case where the tile 72 of "address face preparation" is operated on the function selection screen 70 by the user operation, the CPU 12 displays an address face editing screen (not shown) on the display 13. The address face editing screen includes an address face editing area, a printer selection field, a sheet type selection field, and a printing execution button. In a case where the printing execution button is selected on the address face editing screen by the user operation, the CPU 12 displays the progressing screen 81 shown in FIG. 4. In the progressing screen 81, in a case where the progress bar 83 reaches 100%, the printing processing by the printer is completed.

In the printing system 100 configured as described above, in some cases, a specific Web page is displayed on the display 13 of the information processing device 10 in accordance with a printer configured to execute the printing processing. For example, when the CPU 12 designates a URL of a link destination to open the Web browser 22, the server 40 reads the display data 45 corresponding to the URL designated by the CPU 12 from the memory 44, and transmits the same to the information processing device 10. The CPU 12 displays an information page 85 shown in FIG. 5 by using the display data 45 transmitted from the server 40. In the meantime, the description "designating a URL" means that the CPU 12 receives an IP address corresponding to the URL from a Domain Name System (DNS) server, and designates data to the server 40 by the received IP address.

Figure 5:
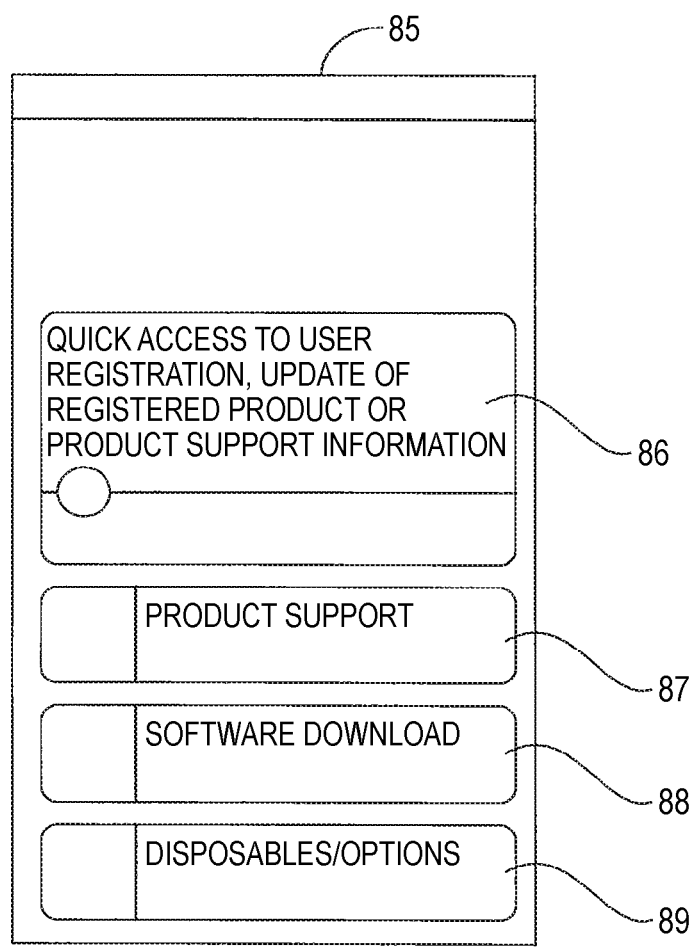
FIG. 5 depicts an information page.

The information page 85 shown in FIG. 5 includes a text display area 86 for displaying a content of a page and each of tiles 87, 88 and 89 of "product support", "software download" and "disposables/options". For example, when the tile 87 of "product support" is operated by the user operation, the CPU 12 that opens the Web browser 22 designates a URL of a Web page, which is a link destination of the tile 87, to the server 40. The server 40 reads the display data 45 corresponding to the URL designated by the CPU 12 from the memory 44, and transmits the same to the information processing device 10.

In the printing system 100 configured as described above, if the information page 85 is displayed on the display 13 at a timing at which the user performs diverse operations relating to the printing processing on the screen displayed on the display 13, since the user operation is interrupted, there is concern that the user may feel uncomfortable. In the present embodiment, the CPU 12 that executes the control application 20 designates a URL to open the Web browser 22 after an execution instruction by a user for printing processing and the like to a printer is received and in a case where it is determined that a specific condition is satisfied.

Figure 6:
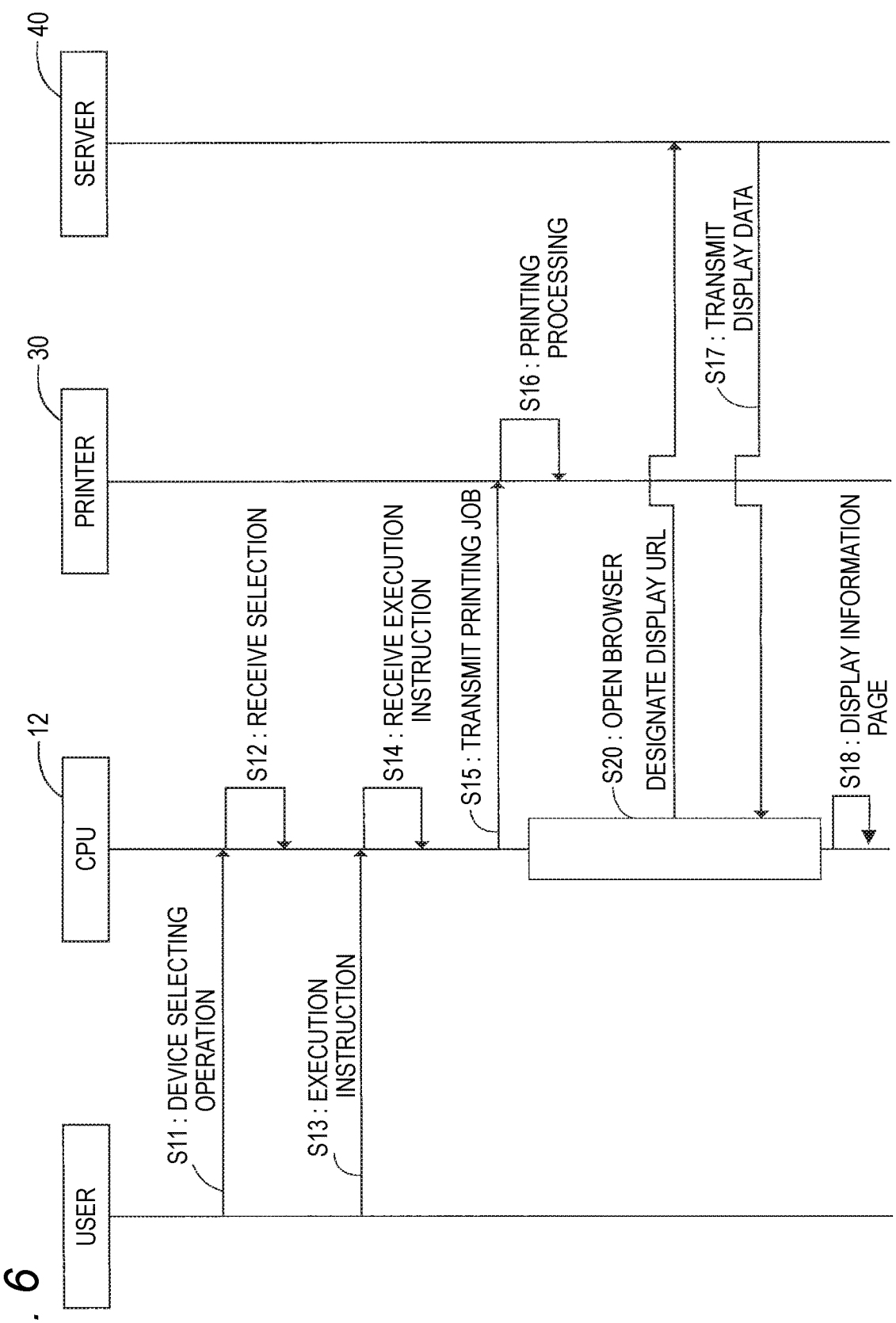
FIG. 6 is a timing chart depicting a sequence of printing processing in accordance with a first embodiment.

Subsequently, processing that is executed among the user, the CPU 12 that executes the control application 20, the printer 30 and the server 40 when the printer 30 executes the printing processing is described with reference to FIG. 6. In FIG. 6, processing that is executed until the information page 85 shown in FIG. 5 is displayed on the information processing device 10 is shown.

In step S11, the user operates the printer selection field 77 on the communication face editing screen 75 shown in FIG. 3, so that the "printer A" is selected as a printer for executing postcard printing. In step S12, the CPU 12 that executes the control application 20 selects the "printer A" as a target device of the printing processing, in response to the operation in step S11.

In step S13, for example, the user operates the printing execution button 80 on the communication face editing screen 75, so that an execution instruction for the printing processing is issued for the information processing device 10. In step S14, the CPU 12 that executes the control application 20 receives the execution operation executed in step S13, and in step S15, the CPU 12 prepares a printing job corresponding to a communication face and transmits the prepared printing job to the printer 30. In step S16, the printer 30 executes the printing processing by using the printing job transmitted from the information processing device 10.

After transmitting the printing job to the printer 30 in step S15, in step S20, the CPU 12 opens the Web browser 22 to display the information page 85 corresponding to the printer 30 ("printer A"). Specifically, the CPU 12 designates a display URL of the information page 85 to the server 40 by a function of the Web browser 22. The detailed processing of step S20 will be described later.

When the server 40 receives the designation of the display URL from the information processing device 10, the server 40 reads the display data 45 designated by the display URL and transmits the display data 45 to the information processing device 10, in step S17. In step S18, the CPU 12 displays the information page 85 on the display 13 by using the display data 45 received from the server 40 by a function of the Web browser.

Figure 7:
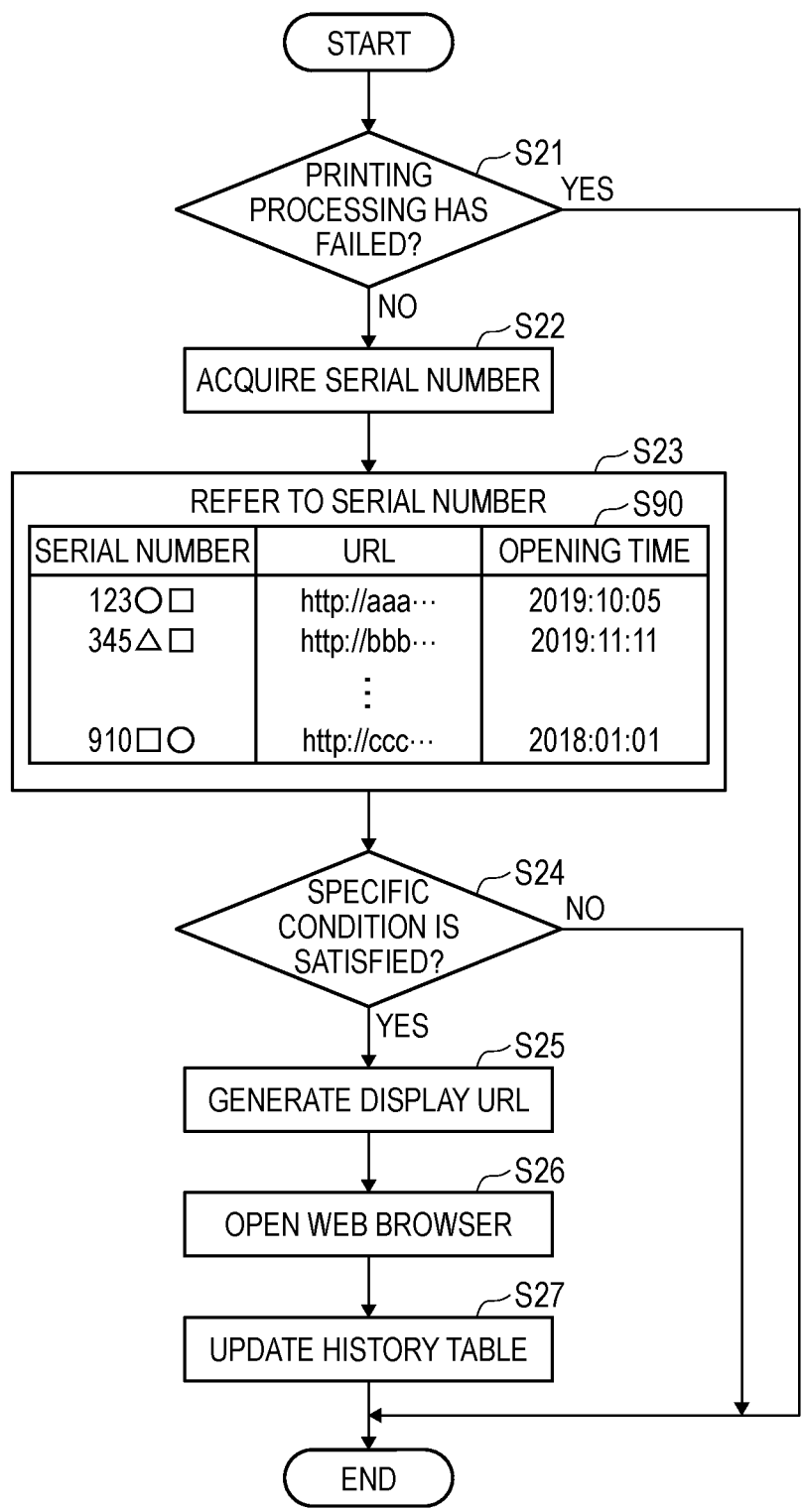
FIG. 7 is a flowchart illustrating an opening sequence of a browser.

Subsequently, the processing that is executed in step S20 of FIG. 6 is described in detail with reference to FIG. 7. The processing shown in FIG. 7 is processing that is executed by the CPU 12 that executes the control application 20. Therefore, in descriptions below, the subject that executes each step is omitted.

In step S21, it is determined whether the printing processing to the printer 30 has failed. In a case where the execution command for the printing processing to the printer 30 is normally transmitted as a printing job in step S15 of FIG. 6 or in a case where transmission of the printing job is cancelled by the user operation on the cancel button 84, a determination result in step S21 is negative. When a determination result in step S21 is negative, the processing proceeds to step S22. On the other hand, when the printing job is not normally transmitted due to disconnection of the communication between the information processing device 10 and the printer 30, for example, and the printing processing has thus failed, a determination result in step S21 is affirmative and the processing of FIG. 7 is once ended.

In step S22, a serial number of the printer selected in step S12 as a target device for executing the printing processing is acquired from the printer 30. In the present embodiment, the serial number is acquired as the identification information. However, a printer name and a model name may also be acquired as the identification information.

In step S23, history information stored in a history table 90 in the memory 16 is referred to. In the history table 90, as the history information, the serial number of the printer acquired in step S22, the display URL and opening time of the Web browser at the time when the information page 85 was displayed in the past are stored in association with each other. For example, in the history table 90, the display URL "http://aaa . . . " and the opening time "2018:10:05" are associated with the serial number "123○☐". This indicates that, when the printer having the serial number "123○☐" was caused to execute the printing processing in the past, the Web browser 22 was opened on "Oct. 5, 2019" to display the information page 85 of the URL "http://aaa . . . ".

The history table 90 includes history information that the CPU 12 has stored by execution of the control application before update (pre-update program 23) and history information that the CPU 12 has stored by execution of the control application 20 after update. In the present embodiment, the history information that the CPU 12 has stored by execution of the control application before update is the serial number "910☐○", and the display URL "http://ccc . . . " and opening time "2018:01:01" are associated with the serial number. In other words, the CPU 12 can accumulate the history information stored before and after update of the control application 20 in the history table 90.

Returning to FIG. 7, it is determined in step S24 whether the specific condition for opening the Web browser 22 is satisfied. In the present embodiment, in a case where all of the four conditions described below are satisfied, it is determined that the specific condition is satisfied.

The progress bar 83 has reached 100% in the progressing screen 81 (FIG. 4).

The cancel button 84 has not been operated in the progressing screen 81.

The serial number acquired in step S22 is not already stored in the history table 90.

The information processing device 10 is connected to the network 200.

When it is determined in step S24 that the specific condition is not satisfied, the processing shown in FIG. 7 is once ended. That is, the processing is ended without opening the Web browser 22. On the other hand, when it is determined in step S24 that the specific condition is satisfied, the processing proceeds to step S25 to generate the display URL corresponding to the acquired serial number. In the present embodiment, different display URLs may be generated in accordance with a type of the control application 20 and the processing (the printing processing, the scan processing) that is executed by the printer.

In step S26, the display URL generated in step S25 is used to open the Web browser 22. The server 40 reads and transmits the display data 45 corresponding to the designated display URL to the information processing device 10. Thereby, the information page 85 is displayed on the display 13 by the function of the Web browser 22.

In step S27, the history table 90 is updated. Specifically, the URL generated in step S25 and the opening time at which the Web browser 22 was opened in step S26 are stored in association with the serial number acquired in step S22.

In FIG. 6, step S12 is an example of the selecting of the target device, and step S14 is an example of the receiving of the execution instruction. In FIG. 7, step S22 is an example of the acquiring of the identification information, and step S24 is an example of the determining of whether the specific condition is satisfied. Step S25 is an example of the generating of the display URL, and step S26 is an example of the opening of the Web browser. Step S27 is an example of the storing of the acquired identification information and the storing of the display URL.

In the first embodiment as described above, the following effects can be achieved. The CPU 12 acquires the serial number of the printer that is caused to execute the printing processing, and generates the display URL for displaying the information page 85 that is a Web page corresponding to the acquired serial number. The CPU 12 opens the Web browser 22 by designating the generated display URL after the execution instruction by a user is received and in a case where it is determined that the specific condition is satisfied. Thereby, the Web browser 22 is opened after the execution instruction for the printing processing is received from the user and after the specific condition is satisfied. As a result, since the Web browser 22 is opened at the timing at which the user operation for the printing processing is completed, for example, it is possible to display the information page 85 on the display 13 at a timing at which the user does not feel uncomfortable.

The CPU 12 opens the Web browser 22 after transmitting the printing instruction to the printer 30, in response to receiving the execution instruction for the printing processing by the user. Thereby, it is possible to prevent the printing processing of the printer from being interrupted due to the opening of the Web browser, and to cause the printer to securely execute the printing processing.

The CPU 12 stores the acquired serial number in the history table 90 each time the Web browser 22 is opened. The CPU 12 sets, as at least one of the specific conditions, that the serial number acquired in the current processing is not already stored in the history table 90. Thereby, in a case where the information processing device 10 has displayed the information page 85 in a printing processing in the past, the information page 85 is not displayed in the printing processing in which the same printer is used as the printing processing in the past. As a result, it is possible to suppress the same information page 85 from being unnecessarily displayed.

The CPU 12 executes the update processing of updating the control application 20. After executing the update processing, the CPU 12 determines whether the display URL is stored in the history table 90 based on all the display URLs including a display URL stored before execution of the update processing. In the above configuration, after the pre-update program 23 is updated to the control application 20, whether the specific condition is satisfied is determined based on all the display URLs including a display URL stored before the update of the control program. Thereby, the CPU 12 can determine whether the information page 85 was displayed on the display 13 in the past, irrespective of whether the control application 20 has been updated.

The CPU 12 generates the display URL based on at least one of a type of the control program and a type of the data processing, and designates the generated display URL to display the information page 85. Thereby, it is possible to cause the information processing device 10 to display the Web page corresponding to the processing that is executed by the control application 20 and the printers 30 to 32.

First Modified Embodiment of First Embodiment

In step S24, the CPU 12 may determine that the specific condition is satisfied in a case where all of the three conditions described below are satisfied.

In the progressing screen 81, the progress bar 83 has reached 100%.

In the progressing screen 81, the cancel button 84 has not been operated.

The serial number acquired in step S22 is not already stored in the history table 90, or, the serial number acquired in step S22 is already stored in the history table 90 and a first period or longer has passed since the opening time which is associated with the stored serial number at a time when the CPU 12 currently determines in step S24 whether the specific condition is satisfied.

That is, in the present embodiment, even in a case where the serial number acquired in step S22 is already stored in the history table 90, in a case where a first predetermined time has elapsed since the opening time of the Web browser 22, the CPU 12 determines in step S24 that the specific condition is satisfied. For example, the first predetermined time may be one year.

In the present embodiment as described above, the CPU 12 sets, as one of the specific conditions, that the serial number acquired this time is already stored in the history table 90 and the first predetermined time has passed since the opening time associated with the serial number already stored at the time when whether the specific condition is satisfied is currently being determined. Thereby, even in a case where the information page 85 is displayed on the display 13, in a case where the first predetermined time has elapsed since the information page 85 is displayed, the information page 85 is again displayed on the display 13. As a result, it is possible to notify the user about contents of the information page.

Second Modified Embodiment of First Embodiment

The CPU 12 may set, as one of the specific conditions, that the control application 20 is executed on the foreground. Specifically, the CPU 12 can display, for example, the communication face editing screen or the address face editing screen on the forefront of the display 13 by executing the control application 20 on the foreground. Thereby, the CPU 12 can receive, on the displayed communication face editing screen or address face editing screen, the execution instruction for the printing processing by the user operation. On the other hand, the CPU 12 hides, for example, the communication face editing screen or the address face editing screen from the display 13 by executing the control application 20 on the background. Specifically, when the touch panel 14 or the physical key of the information processing device 10 is operated and the control application 20 is thus executed on the background, the CPU 12 hides each screen displayed on the display 13.

When it is determined in step S24 that the control application 20 is executed on the background, the CPU 12 determines that the specific condition is not satisfied and once ends the processing of FIG. 7. On the other hand, when it is determined in step S24 that the control application 20 is executed on the foreground, the CPU 12 determines that the specific condition is satisfied, and proceeds to step S25 to generate the display URL. In the present embodiment, the state where the CPU 12 executes the control application 20 on the foreground and each screen is thus displayed is a first state. Also, the state where the CPU 12 executes the control application 20 on the background and each screen is not thus displayed is a second state.

In the present embodiment as described above, the CPU 12 sets, as one of the specific conditions, that the control application 20 is not executed on the background and each screen is not thus hidden after the CPU 12 has received the execution instruction for the printing processing on the screen while executing the control application 20 on the foreground. Thereby, for example, it is possible to prevent the information page 85 from being displayed while the information processing device 10 is activating a program other than the control application 20.

Third Modified Embodiment of First Embodiment

The CPU 12 may set, as one of the specific conditions in step S24, that the serial number is acquired in step S22. Thereby, since the information page 85 is not displayed on the display 13 for a device that cannot be recognized by a serial number, it is possible to prevent an erroneous information page 85, which does not correspond to the printer, from being displayed on the information processing device 10.

In step S24, the CPU 12 may not set, as the specific condition, that the information processing device 10 is connected to the network 200. In this case, for example, in step S26, the Web browser 202 is opened and the network IF 15 is controlled to connect the information processing device 10 to the network 200.

Second Embodiment

In a second embodiment, configurations that are different from the first embodiment are mainly described. The same reference signs between the first embodiment and the second embodiment indicate the same elements, and the descriptions thereof are omitted.

Figure 8:
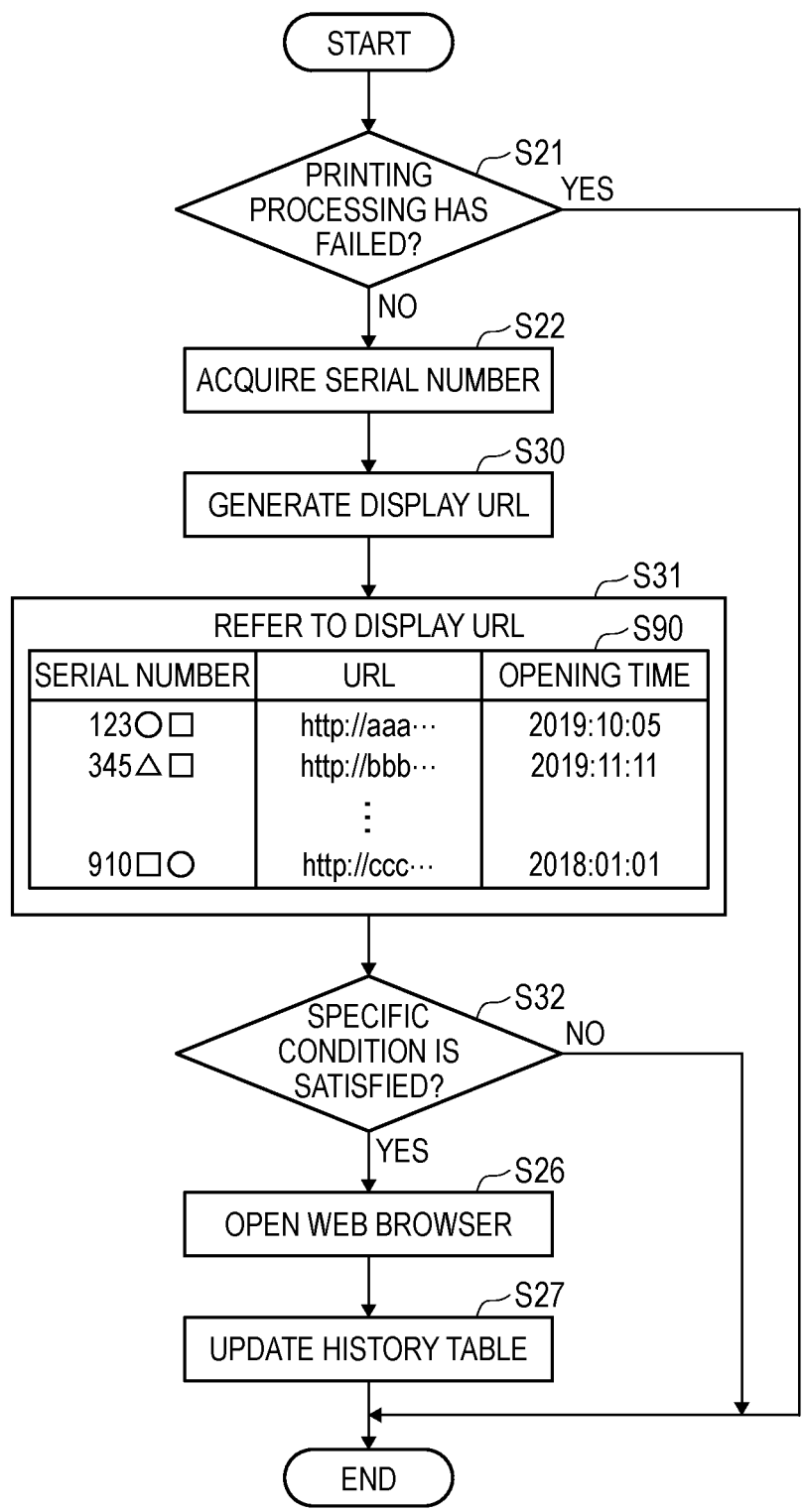
FIG. 8 is a flowchart illustrating an opening sequence of the browser in accordance with a second embodiment.

In the present embodiment, the CPU 12 sets, as one of the specific conditions, that the generated display URL is not already stored in the history table 90. In the present embodiment, a detailed sequence of the processing that is executed in step S20 of FIG. 6 is described with reference to FIG. 8. The processing shown in FIG. 8 is processing that is executed by the CPU 12 in a case where the control application 20 is activated.

When the serial number is acquired in step S22, the processing proceeds to step S30. In step S30, a display URL corresponding to the serial number acquired in step S22 is generated.

In step S31, the display URL stored in the history table 90 is referred to. In step S32, it is determined whether the specific condition is satisfied. In the present embodiment, it is determined that the specific condition is satisfied in a case where all of the three conditions described below are satisfied.

In the progressing screen 81, the progress bar 83 has reached 100%.

In the progressing screen 81, the cancel button 84 has not been operated.

The display URL generated in step S30 is not already stored in the history table 90.

When it is determined in step S32 that the specific condition is satisfied, the processing passes through step S26, and opens the Web browser in step S27. On the other hand, in a case where a determination result in step S32 is negative, the processing of FIG. 8 is once ended.

Also in the present embodiment as described above, the similar effects to the first embodiment can be achieved.

First Modified Embodiment of Second Embodiment

In the second embodiment, the following condition may be added to the specific condition that is determined in step S32.

The display URL generated in step S30 is already stored in the history table 90 and a second predetermined period or longer has passed since the opening time which is associated with the stored display URL at the time when the CPU 12 determines in step S32 whether the specific condition is satisfied. For example, the second predetermined time may be one year.

In the present embodiment as described above, even in a case where the information page 85 is displayed on the display 13, in a case where the second predetermined time has elapsed since the information page 85 has been displayed, the information page 85 is again displayed on the display 13. As a result, it is possible to notify the about contents of the information page.

Second Modified Embodiment of Second Embodiment

The CPU 12 may display the information page 85 by execution of the label application 21, in addition to the execution of the control application 20. In this case, the label application 21 can execute the processing of FIGS. 6 and 8, similarly to the control application 20. As a result, in step S27, a first URL that is the display URL generated while the CPU 12 executes the control application 20 and a second URL that is the display URL generated while the CPU 12 executes the label application 21 are stored in the history table 90.

In the next processing shown in FIG. 7, the CPU 12 determines in step S32 whether the display URL generated in step S22 is already stored in the history table 90 by referring to the first URL and second URL stored in the history table 90.

In the present embodiment as described above, in a case where the information processing device 10 displays the information page 85 on the display 13 by executing any one of the applications 20 and 21, the information page 85 is not displayed thereafter. Thereby, even in a configuration where the CPU 12 can display the information page 85 by individual applications, it is possible to suppress the information page 85 from being unnecessarily displayed.

Third Embodiment

In a third embodiment, configurations that are different from the first embodiment are mainly described. The same reference signs between the first embodiment and the third embodiment indicate the same elements, and the descriptions thereof are omitted.

Figure 9:
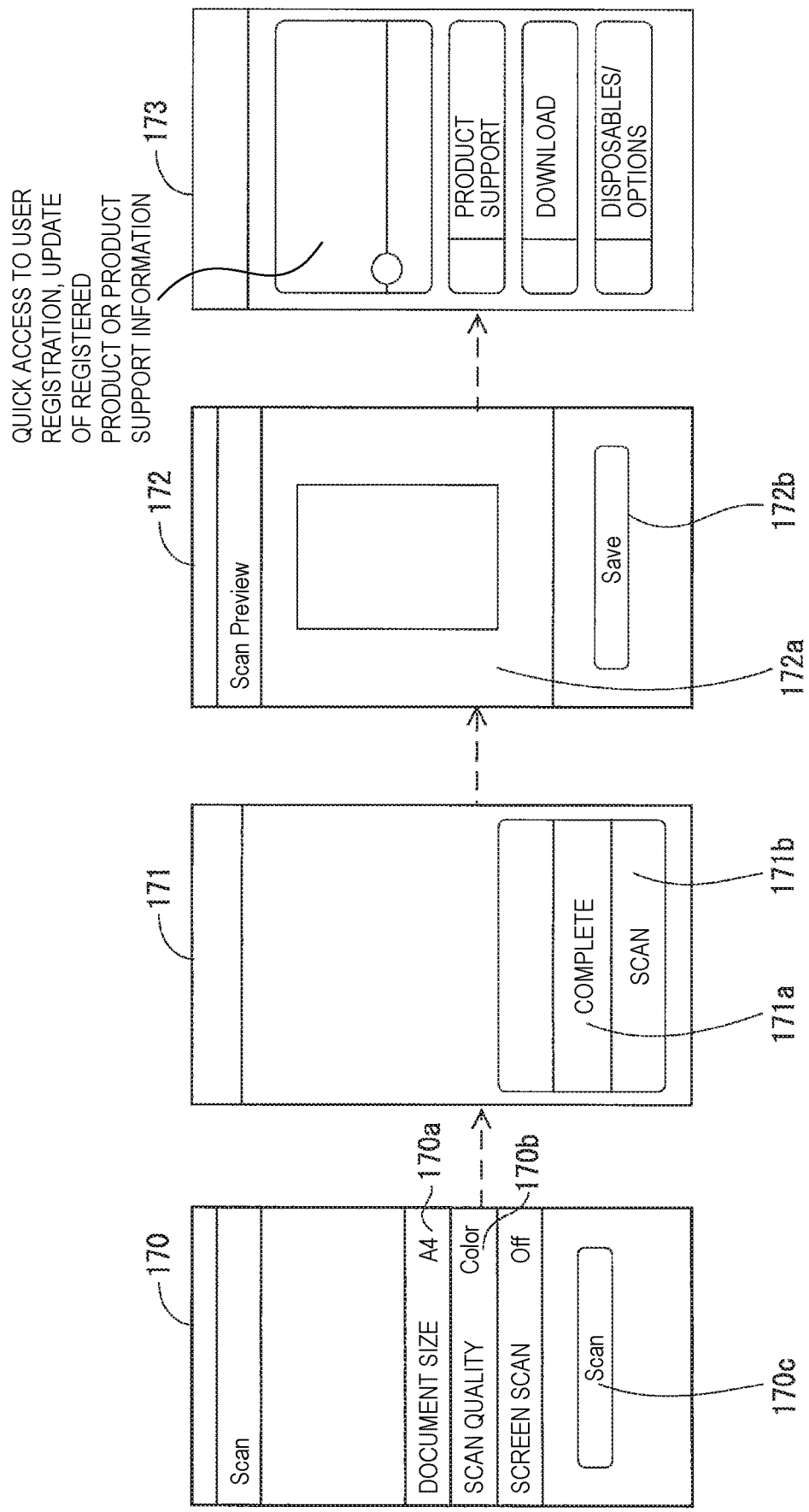
FIG. 9 depicts transition of a screen in accordance with a third embodiment.

In the present embodiment, the opening of the Web browser 22 is described by taking, as an example, a case where the printer 31 that is a complex machine is selected as a target device. FIG. 9 depicts transition of a screen that is displayed on the information processing device 10 in a case where the printer 31 is caused to execute the scan processing.

In the function selection screen (not shown), when the scan processing is selected as a function of the printer 31, the CPU 12 displays a scan setting screen 170 shown in FIG. 9 on the display 13. The scan setting screen 170 includes a document size field 170a, a scan quality field 170b, and a scan execution button 170c. By operating the document size field 170a, the user can change a size of a document that is read by an image reading unit of the printer 31. Also, the user can change a reading method (color or monochrome) of a document and a reading resolution by operating the scan quality field 170b.

When the scan execution button 170c is operated by the user operation, the CPU 12 displays a progressing screen (not shown) on the display 13. In the progressing screen, a content in which the character string "printing" of FIG. 4 is switched to "scan" is displayed. When the progress bar displayed in the progressing screen changes to 100%, the CPU 12 displays a re-operation receiving screen 171 on the display 13. The re-operation receiving screen 171 includes a completion button 171a for instructing the printer 31 to end the scan processing, and a re-scan button 171b for re-executing the scan processing for a document. When the re-scan button 171b is operated by the user operation, the CPU 12 causes the printer 31 to resume the document reading. On the other hand, when the completion button 171a is operated by the user operation, the CPU 12 displays a preview screen 172 on the display 13.

The preview screen 172 includes a display area 172a in which document data transmitted from the printer 31 to the information processing device 10 is displayed, and a save area 172b for receiving an instruction as to whether to save the document data displayed in the display area 172a. When the save area 172b is operated by the user operation, the CPU 12 executes save processing of saving the document data.

In a case where the user operates the save area 172b to execute the save processing for the document data, the CPU 12 displays an information page 173. That is, in the present embodiment, after the execution instruction by the user for the scan processing is received and in a case where the save area 172b is operated on the preview screen 172 and the specific condition is satisfied, the information page 173 is displayed on the display 13.

Figure 10:
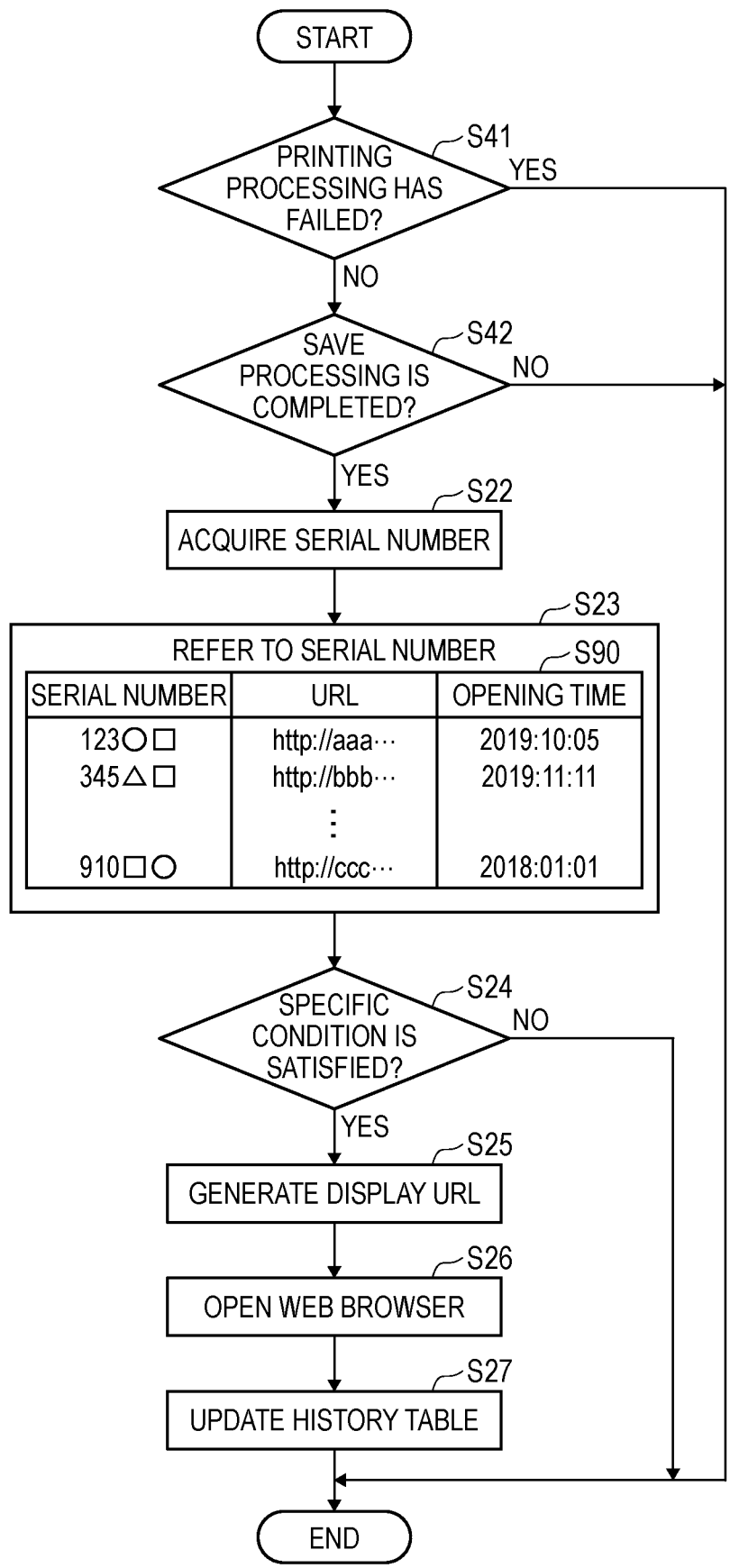
FIG. 10 is a flowchart depicting an opening sequence of the browser.

Next, the processing that is executed in step S20 of FIG. 6 in accordance with the present embodiment is described in detail with reference to FIG. 10.

In step S41, it is determined whether the scan processing to the printer 31 has failed. Specifically, in a case where the completion button 171a of the re-operation receiving screen 171 is operated, i.e., in a case where the execution command for the scan processing to the printer 31 and the reception of the read document data are normally completed or when the scan processing is cancelled by the user operation on a cancel button displayed on a progressing screen (not shown), a determination result in step S41 is negative. When the determination result in step S41 is negative, the processing proceeds to step S42. On the other hand, in a case where the execution command for the scan processing or the document data are not normally transmitted due to disconnection of communication between the information processing device 10 and the printer 31 and the scan processing has thus failed, for example, a determination result in step S41 is affirmative and the processing of FIG. 10 is once ended.

It is determined in step S42 whether the save processing has completed. Specifically, in a case where the save area 172b is operated by the user operation and the saving of the document data into the memory 16 is then completed, the save processing is completed. When a determination result in step S42 is affirmative, the processing proceeds to step S22. On the other hand, when a determination result in step S42 is negative, the processing of FIG. 10 is once ended.

In step S22, a serial number of the printer 31 caused to execute the scan processing is acquired. After passing through step S23, when it is determined in step S24 that the specific condition for opening the Web browser 22 is satisfied, a display URL is generated in step S25. In step S26, the display URL is designated to open the Web browser 22. Thereby, the information page 173 (FIG. 9) is displayed on the display 13.

In the present embodiment as described above, the following effects can be achieved. The printer 31 executes the scan processing of acquiring and transmitting document data to the information processing device 10, and the CPU 12 executes the save processing of saving the document data transmitted by the scan processing. The CPU 12 opens the Web browser 22 after receiving the execution instruction for executing the scan processing by the user operation and transmitting the execution command for the scan processing to the printer 31 in response to the execution instruction for the scan processing and in a case where it is determined that the save processing is completed and the specific condition is satisfied. Thereby, the information page 85 is displayed, so that the saving of the document data acquired by the scan processing is prevented from being interrupted and the document data can be securely saved.

Modified Embodiment of Third Embodiment

The information processing device 10 may be configured to execute transmission processing of transmitting document data to another device connected to the network 200, as the second processing. In this case, the processing may proceed to step S22 in a case where the transmission processing is completed in step S42 of FIG. 10. Also in this present embodiment, the similar effects to the third embodiment can be achieved.

Fourth Embodiment

In a fourth embodiment, configurations that are different from the first embodiment are mainly described. The same reference signs between the first embodiment and the fourth embodiment indicate the same elements, and the descriptions thereof are omitted.

Figure 11:
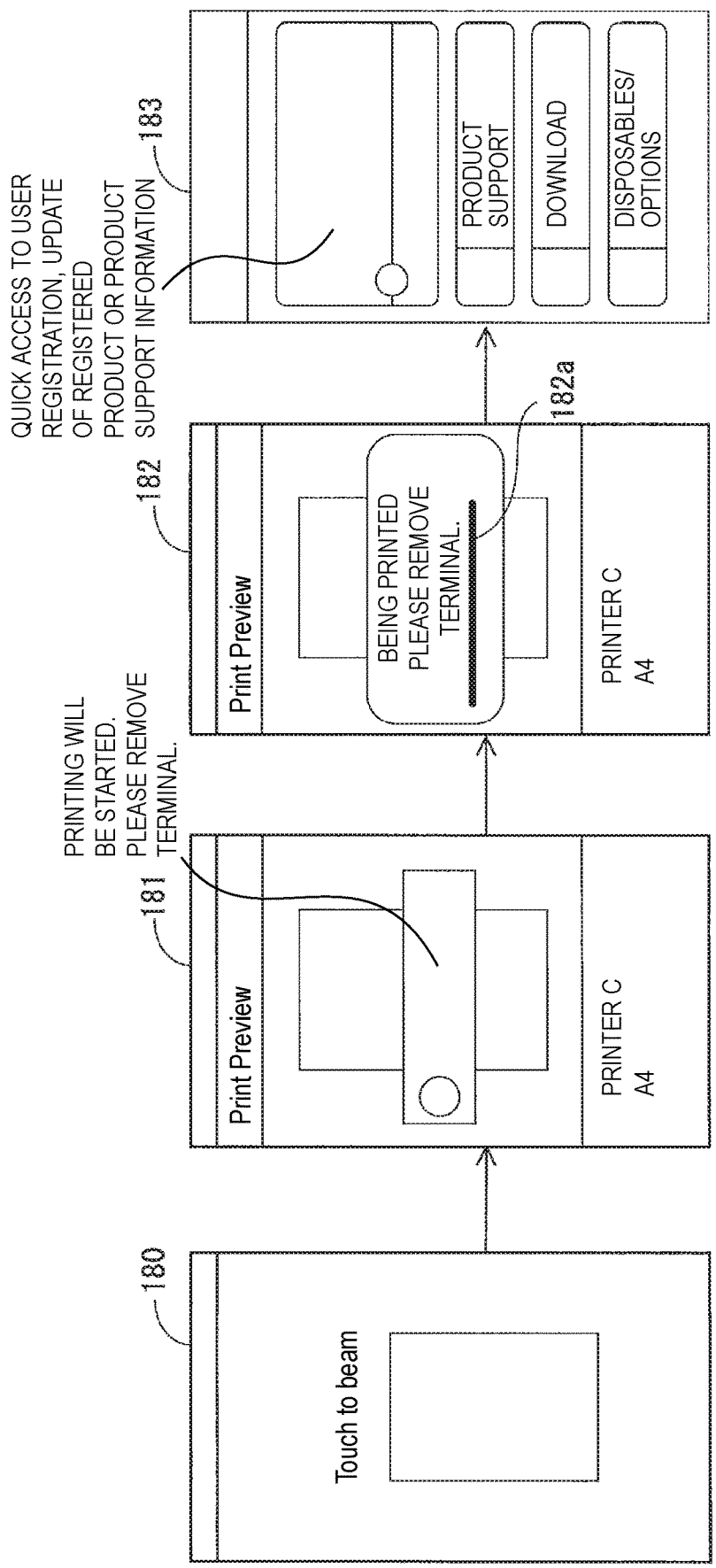
FIG. 11 depicts transition of a screen in accordance with a fourth embodiment.
Figure 12:
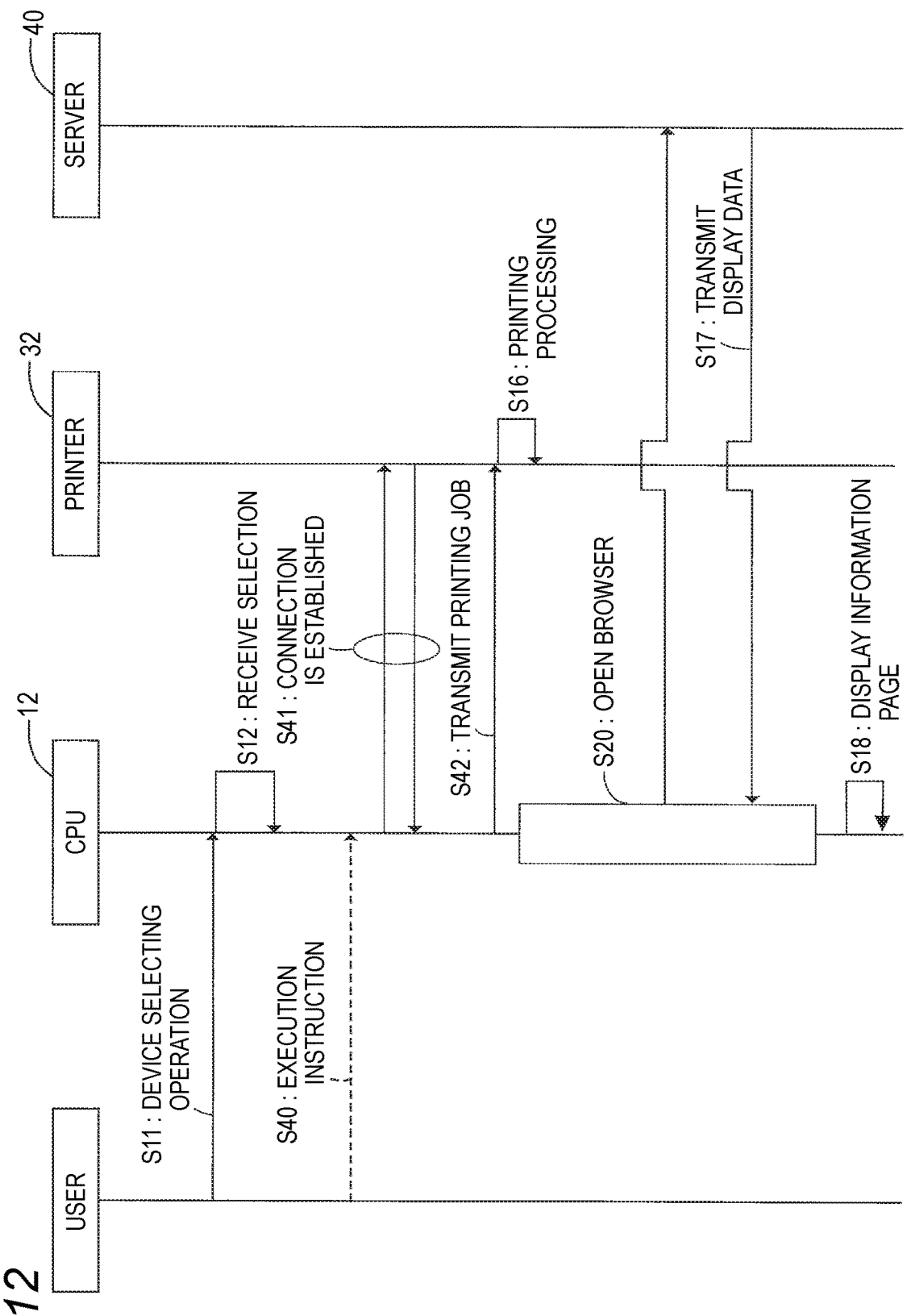
FIG. 12 is a timing chart depicting a sequence of the printing processing.

In the present embodiment, the opening of the Web browser 22 is explained by taking, as an example, a case where the printer 32 conforming to NFC is selected as a target device. FIG. 11 depicts transition of a screen that is displayed on the information processing device 10 in a case where the information processing device 10 transmits a printing job to the printer 32 by NFC. FIG. 12 is a sequence diagram illustrating processing that is executed among the user, the CPU 12, the printer 32 and the server 40, in the present embodiment.

In step S40 of FIG. 12, the user issues an execution instruction for the printing processing to the printer 32. In the present embodiment, when a printing function is selected in the function selection screen (not shown) via NFC by the user operation and the user brings the information processing device 10 into contact with an antenna unit (communication area) of the printer 32, the CPU 12 displays a communication start screen 180 shown in FIG. 11 on the display 13.

In step S41, connection conforming to NFC standards is established between the NFC IF 17 of the information processing device 10 and the printer 32. In step S41, processing such as pairing, authentication and the like is executed as the connection establishment between the information processing device 10 and the printer 32. In the present embodiment, when the user operates the touch panel 14 in a state where the communication start screen 180 is displayed on the display 13, the CPU 12 starts the connection establishment with the printer 32.

In step S42, the CPU 12 generates a printing job, and transmits the generated printing job to the printer 32 via wireless communication established in step S41. In step S16, the printer 32 executes the printing processing by using the printing job transmitted from the information processing device 10. At this time, the CPU 12 displays, on the display 13, a progressing screen 182 indicating a transition until the printing processing by the printer 32 is completed. In the progressing screen 182, a progress bar 182a that visually displays a degree of completion of the printing processing by the printer 32 is displayed.

In step S20, the CPU 12 opens the Web browser 22 to display an information page 183 on the display 13. In the present embodiment, the CPU 12 displays the information page 183 as the specific page in a case where the information processing device 10 is brought into contact with the antenna unit of the printer 32 and the completion of the printing processing is then displayed in the progressing screen 182. For this reason, the user's action of bringing the information processing device 10 into contact with the antenna unit of the printer 32 or the user's action of operating the touch panel 14 on the communication start screen 180 in step S40 corresponds to the execution instruction for the printing processing.

In the present embodiment as described above, the configuration where the printing job is transmitted between the information processing device 10 and the printer 32 via NFC can also achieve the similar effects to the first embodiment.

Other Embodiments

The CPU 12 may display a Web page other than the information page as the specific page. In this case, the CPU 12 is configured to generate individual display URLs based on at least one of the type of the control program and the type of the data processing that is executed by the printers 30 to 32.

The CPU 12 may set, as the specific condition, that both the acquired serial number and the generated display URL are not already stored in the history table 90. Also, the CPU 12 may not store the opening time of the Web browser 22 in the history table 90.

The control application 20 may be an application relating to specific data processing that is executed by a device, and is not limited to an application relating to the postcard printing that is executed by the printer. In this case, the CPU 12 opens the control application 20 to execute the label application 21. Then, the CPU 12 may execute the control application 20 to cause the printer to print the label image prepared by execution of the label application 21. The target device may be a device capable of performing communication with the information processing device 10, and may be a scanner device, instead of the printer and the complex machine.

The server 40 may be configured by a plurality of devices. In this case, the functions of the server 40 described in the present embodiment may be implemented by a server having a function of performing communication with the information processing device 10 and a server having a function of managing display data.

The computer is not limited to the CPU, and may be implemented by an application specific integrated circuit (ASIC) or another logical integrated circuit, or by cooperation of the CPU. ASIC, and another logical integrated circuit.

What is claimed is:

1. A non-transitory computer-readable storage medium storing a control program readable by a computer of an information processing device, the information processing device including an operation unit, a display, and a communication unit and capable of connecting to a network via the communication unit, and the control program, when executed by the computer, causing the information processing device to perform:
   selecting a target device for executing predetermined data processing based on an operation received by the operation unit, the predetermined data processing being printing processing or scan processing;
   receiving an execution instruction by a user, which is for causing the selected target device to execute the predetermined data processing;
   acquiring identification information of the target device;
   generating a display URL which is for displaying a specific page on the display by a Web browser, the specific page being a Web page corresponding to the acquired identification information;
   determining whether a specific condition is satisfied, the specific condition being a condition for displaying the specific page on the display; and
   opening the Web browser by designating the generated display URL after the execution instruction is received and in a case where it is determined that the specific condition is satisfied.

2. The non-transitory computer-readable storage medium according to claim 1,
   wherein the predetermined data processing executed by the target device includes output processing of outputting data, and
   wherein the opening of the Web browser includes opening the Web browser after transmitting an execution command for executing the output processing to the target device in response to receiving the execution instruction.

3. The non-transitory computer-readable storage medium according to claim 1,
   wherein the predetermined data processing executed by the target device includes first processing of acquiring predetermined data and transmitting the predetermined data to the information processing device,
   wherein the control program, when executed by the computer, causes the information processing device to further perform:
      second processing of saving or outputting the predetermined data transmitted in the first processing,
   wherein the receiving of the execution instruction includes receiving a first instruction to execute the first processing, and
   wherein the opening of the Web browser includes opening the Web browser after transmitting an execution command for executing the first processing to the target device in response to receiving the first instruction, after executing the second processing, and in a case where it is determined that the specific condition is satisfied.

4. The non-transitory computer-readable storage medium according to claim 1,
   wherein the information processing device is configured to receive display data for displaying the specific page from a server connected via the network, and
   wherein the specific condition includes a condition that the information processing device is connected to the network.

5. The non-transitory computer-readable storage medium according to claim 1,
   wherein the control program, when executed by the computer, causes the information processing device to further perform:
      storing the acquired identification information each time the opening of the Web browser is performed, and
   wherein the specific condition includes a condition that the currently acquired identification information is not already stored.

6. The non-transitory computer-readable storage medium according to claim 5,
   wherein the storing of the acquired identification information includes storing an opening time at which the Web browser has been opened in association with the acquired identification information, and
   wherein the specific condition includes a condition that the currently acquired identification information is already stored and that a first predetermined time has passed since the opening time which is associated with the currently acquired identification information and is already stored at a time when whether the specific condition is satisfied is currently being determined.

7. The non-transitory computer-readable storage medium according to claim 1,
   wherein the control program, when executed by the computer, causes the information processing device to further perform:
      storing the display URL which is designated when the opening of the Web browser is performed, and
   wherein the specific condition includes a condition that the generated display URL is not already stored.

8. The non-transitory computer-readable storage medium according to claim 7,
   wherein the information processing device further includes a memory in which a pre-update program is stored, and the computer is configured to update the pre-update program to the control program, and
   wherein, after the pre-update program has been updated to the control program, whether the display URL is already stored is determined based on all display URLs including a display URL which had been stored before the pre-update program has been updated to the control program.

9. The non-transitory computer-readable storage medium according to claim 7,
   wherein the storing of the display URL includes storing an opening time at which the Web browser has been opened in association with the display URL, and
   wherein the specific condition includes a condition that the display URL is already stored and that a second predetermined time has passed since the opening time which is associated with the display URL and is already stored at a time when whether the specific condition is satisfied is currently being determined.

10. The non-transitory computer-readable storage medium according to claim 7, wherein the control program includes a first program and a second program, wherein the storing of the display URL includes storing a first URL which is stored when the computer executes the first program and the first URL is designated when the opening of the Web browser is performed and storing a second URL which is stored when the computer executes the second program and the second URL is designated when the opening of the Web browser is performed, and wherein whether the generated display URL is already stored is determined based on the first URL and the second URL.

11. The non-transitory computer-readable storage medium according to claim 1, wherein the control program, when executed by the computer, causes the information processing device to further perform:

switch a screen that is displayed by executing the control program, the screen being switched between a first state in which the screen is displayed on the forefront of the display and a second state in which the screen is hidden from the display, wherein the receiving of the execution instruction includes receiving the execution instruction in a case where the screen is in the first state, and wherein the specific condition includes a condition that switching from the first state to the second state has not occurred after the receiving of the execution instruction in the case where the screen is in the first state.

12. The non-transitory computer-readable storage medium according to claim 1, wherein the specific condition includes a condition that the identification information is acquired.

13. The non-transitory computer-readable storage medium according to claim 1, wherein the generating of the display URL includes generating the display URL based on at least one of a type of the control program and a type of the data processing.

14. An information processing device comprising:

an operation unit;

a display;

a communication unit via which the information processing device is capable of connecting to a network; and a controller configured to:

select a target device for executing predetermined data processing based on an operation received by the operation unit, the predetermined data processing being printing processing or scan processing;

receive an execution instruction by a user, which is for causing the selected target device to execute the predetermined data processing;

acquire identification information of the target device;

generate a display URL which is for displaying a specific page on the display by a Web browser, the specific page being a Web page corresponding to the acquired identification information;

determine whether a specific condition is satisfied, the specific condition being a condition for displaying the specific page on the display; and open the Web browser by designating the generated display URL after the execution instruction is received and in a case where it is determined that the specific condition is satisfied.

* * * * *